United States Patent [19]
Ueda

[11] Patent Number: 5,847,713
[45] Date of Patent: Dec. 8, 1998

[54] OUTPUT APPARATUS WITH SIZE CHANGE OF CHARACTER PATTERNS ONLY

[75] Inventor: Shigeru Ueda, Wako, Japan

[73] Assignee: Canon Kabushiki Kaisha, Tokyo, Japan

[21] Appl. No.: 218,455

[22] Filed: Mar. 28, 1994

Related U.S. Application Data

[63] Continuation of Ser. No. 630,857, Dec. 20, 1990, abandoned.

[30] Foreign Application Priority Data

Dec. 28, 1989 [JP] Japan ................................ 1-338552

[51] Int. Cl.⁶ ...................................................... G06T 1/00
[52] U.S. Cl. ............................................ 345/435; 395/110
[58] Field of Search ............................... 395/147, 150, 395/151, 135, 163, 130, 133, 171–172, 788, 109, 110; 345/9, 113–114, 116, 430, 435, 433, 472; 348/586; 358/450–452, 470; 355/243–244; 707/502

[56] References Cited

U.S. PATENT DOCUMENTS

| | | | |
|---|---|---|---|
| 4,516,139 | 5/1985 | Takiguchi | 347/15 |
| 4,584,573 | 4/1986 | Ito | 395/109 X |
| 4,682,161 | 7/1987 | Bugg | 340/731 |
| 4,823,195 | 4/1989 | Shimizu et al. | 358/256 |
| 4,837,564 | 6/1989 | Ogawa et al. | 340/750 |
| 4,882,687 | 11/1989 | Gordon | 364/518 |
| 4,989,042 | 1/1991 | Muramatsu et al. | 355/244 |
| 5,025,396 | 6/1991 | Parks et al. | 345/115 X |
| 5,041,992 | 8/1991 | Cunningham et al. | 364/518 |
| 5,097,427 | 3/1992 | Lathrop et al. | 345/430 |
| 5,113,492 | 5/1992 | Ariki et al. | 395/147 |
| 5,195,180 | 3/1993 | Takakura et al. | 345/114 |

FOREIGN PATENT DOCUMENTS

| | | |
|---|---|---|
| 310891 | 4/1989 | European Pat. Off. . |
| 369702 | 5/1990 | European Pat. Off. . |
| 2089165 | 6/1982 | United Kingdom . |

*Primary Examiner*—Joseph H. Feild
*Attorney, Agent, or Firm*—Fitzpatrick, Cella, Harper & Scinto

[57] ABSTRACT

An output apparatus and method include a character pattern memory for storing a character pattern, a screen pattern memory for storing a screen pattern to be synthesized with the character pattern stored in the character pattern memory, a synthesizer for synthesizing the character pattern stored in the character pattern memory and the screen pattern stored in the screen pattern memory, and a main controller for enlarging/reducing only the character pattern stored in the character pattern memory and synthesizing the enlarged/reduced character pattern with the screen pattern stored in the screen pattern memory when a pattern synthesized by the synthesizer is to be enlarged/reduced.

39 Claims, 5 Drawing Sheets

OUTPUT APPARATUS WITH SIZE CHANGE OF CHARACTER PATTERNS ONLY

This application is a continuation of application Ser. No. 07/630,857, filed Dec. 20, 1990, now abandoned.

BACKGROUND OF THE INVENTION

1. Field of the Invention

The present invention relates to an output apparatus for printing and displaying document data sent from a host computer or the like as a set of dot data.

2. Related Background Art

In a conventional printing apparatus, for example, when an enlargement or reduction (hereinafter generically "size change") command is input for a character emphasized by a screen pattern such as a mesh pattern, a background mesh pattern is generally enlarged/reduced in addition to the target character.

In the above case, a mesh pattern has poor appearance especially upon enlargement. In addition, the target character to be emphasized with the screen pattern such as the mesh pattern undesirably results in poor readability.

Figure 3:
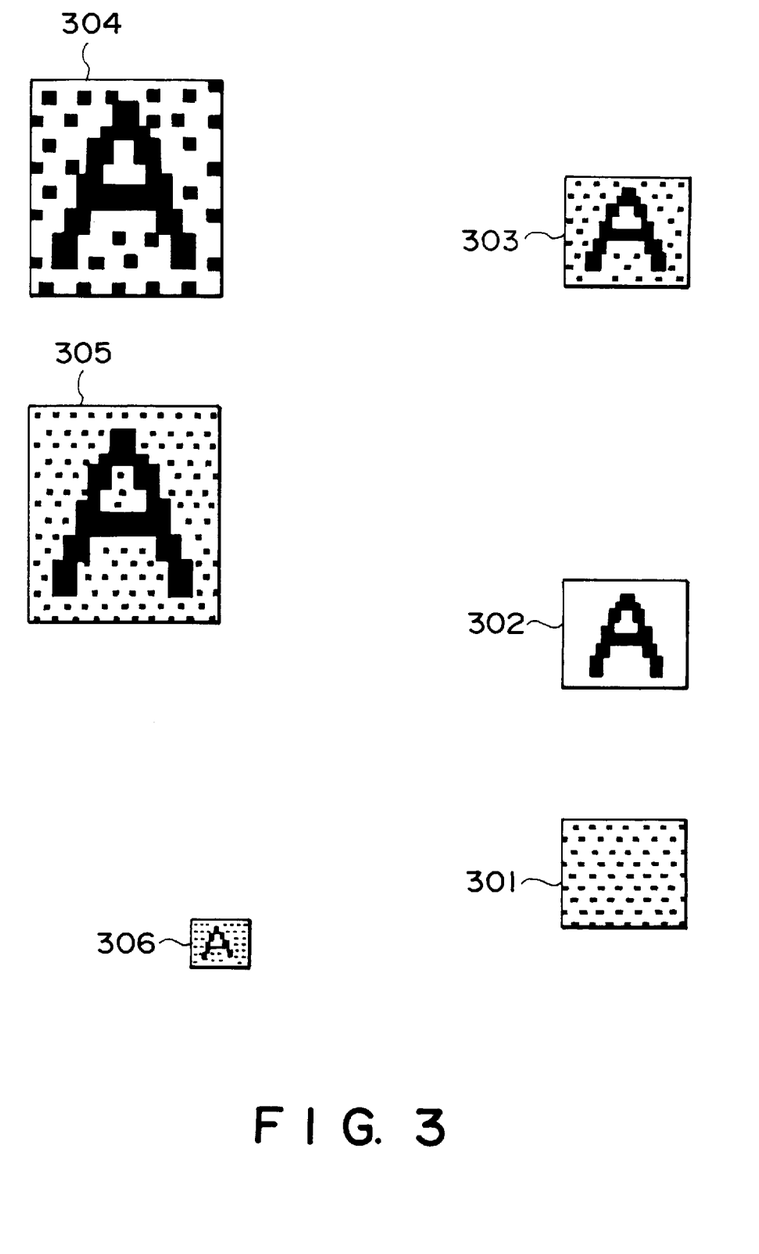
FIG. 3 is a view showing a relationship between a mesh pattern character and enlargement.

For example, when a character pattern with a mesh pattern, as represented by reference numeral 303 in FIG. 3 is enlarged, an enlarged character pattern 304 is obtained. In this pattern, the character pattern "A" apparently has poorer readability than the original character pattern.

SUMMARY OF THE INVENTION

It is an object of the present invention to provide an output apparatus capable of assuring an effect of emphasis of a mesh pattern or the like regardless of character enlargement/reduction and of also assuring excellent readability of characters.

It is another object of the present invention to provide an output apparatus capable of improving readability of a character pattern such that when the character pattern is to be enlarged/reduced and when a screen pattern such as a mesh pattern is present together with the character pattern, the screen pattern is not enlarged/reduced but is synthesized with the enlarged/reduced character pattern.

It is still another object of the present invention to provide an output method capable of improving readability of a character pattern such that when the character pattern is to be enlarged/reduced and when a screen pattern such as a mesh pattern is present together with the character pattern, the screen pattern is not enlarged/reduced but is synthesized with the enlarged/reduced character pattern.

DETAILED DESCRIPTION OF THE PREFERRED EMBODIMENT

The preferred embodiment of the present invention will be described in detail with reference to the accompanying drawings.

Figure 1:
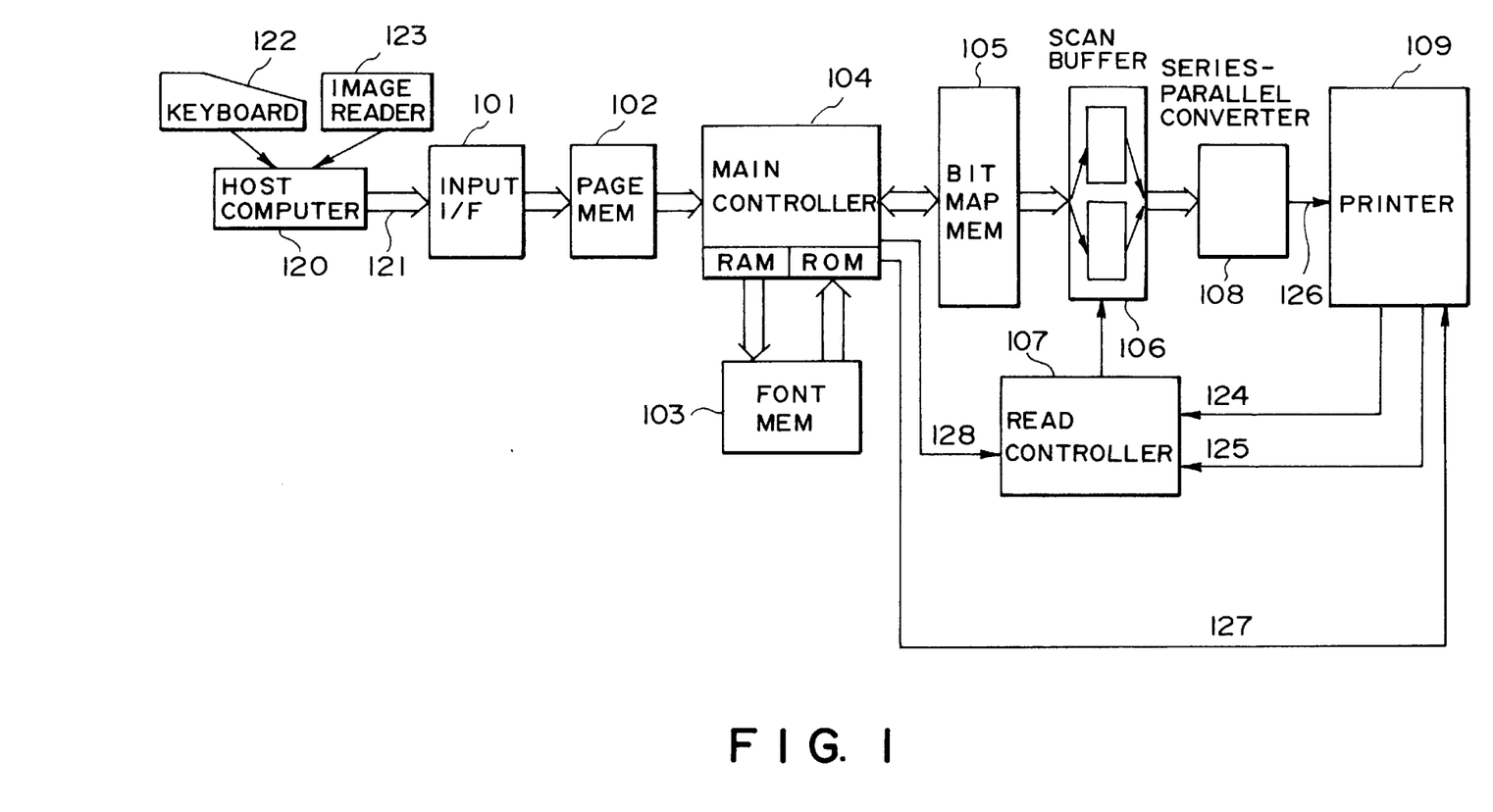
FIG. 1 is a block diagram showing an embodiment of the present invention.

FIG. 1 is a block diagram showing an arrangement of an output apparatus according to an embodiment of the present invention. The output apparatus includes an input interface (input I/F) 101 for receiving document data 121 from a host apparatus such as a host computer 120, a page memory 102 for storing the document data in units of pages, and a font memory 103 for storing a character font pattern and a screen pattern such as a mesh font pattern associated with the present invention.

On the host computer 120 side, document data is input at a keyboard 122 or an image reader 123. In addition, the host computer 120 designates a magnification in enlargement/reduction processing.

The output apparatus also includes a main controller 104 which has a memory (ROM) for storing a control sequence (to be described later) and a memory (RAM) for temporarily storing data. The output apparatus further includes a bit map memory 105 for storing document data converted into a dot pattern, and a scan buffer 106 which serves as a buffer for temporarily storing dot pattern data read out from the bit map memory 105 and sent to a printer 109. In this embodiment, while data is read out from one scan buffer element so as to send read-out data to the printer 109, the next scan dot pattern is written in the other scan buffer element of the scan buffer 106. That is, the scan buffer 106 has a double buffer arrangement.

A read controller 107 reads out dot pattern data from the scan buffer 106 in synchronism with a vertical sync signal 124 and a horizontal sync signal 125 from the printer 109, converts the read-out dot pattern data to a serial signal through a series-parallel converter 108, and sends the parallel data as dot pattern data 126 to the printer 109.

Figure 4A:
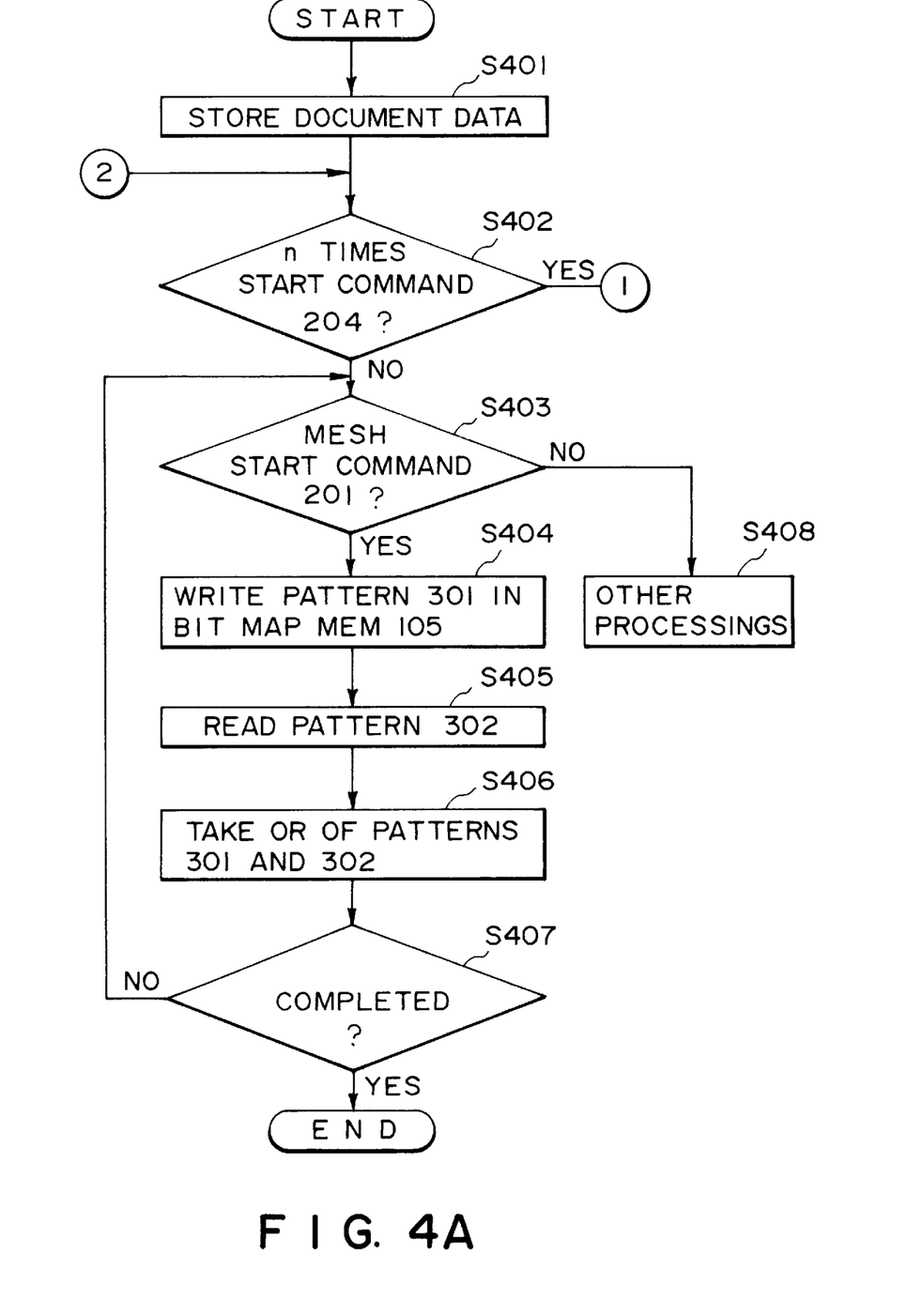
FIGS. 4A and 4B are flow charts for explaining an operation of the printing apparatus according to the embodiment of the present invention.
Figure 4B:
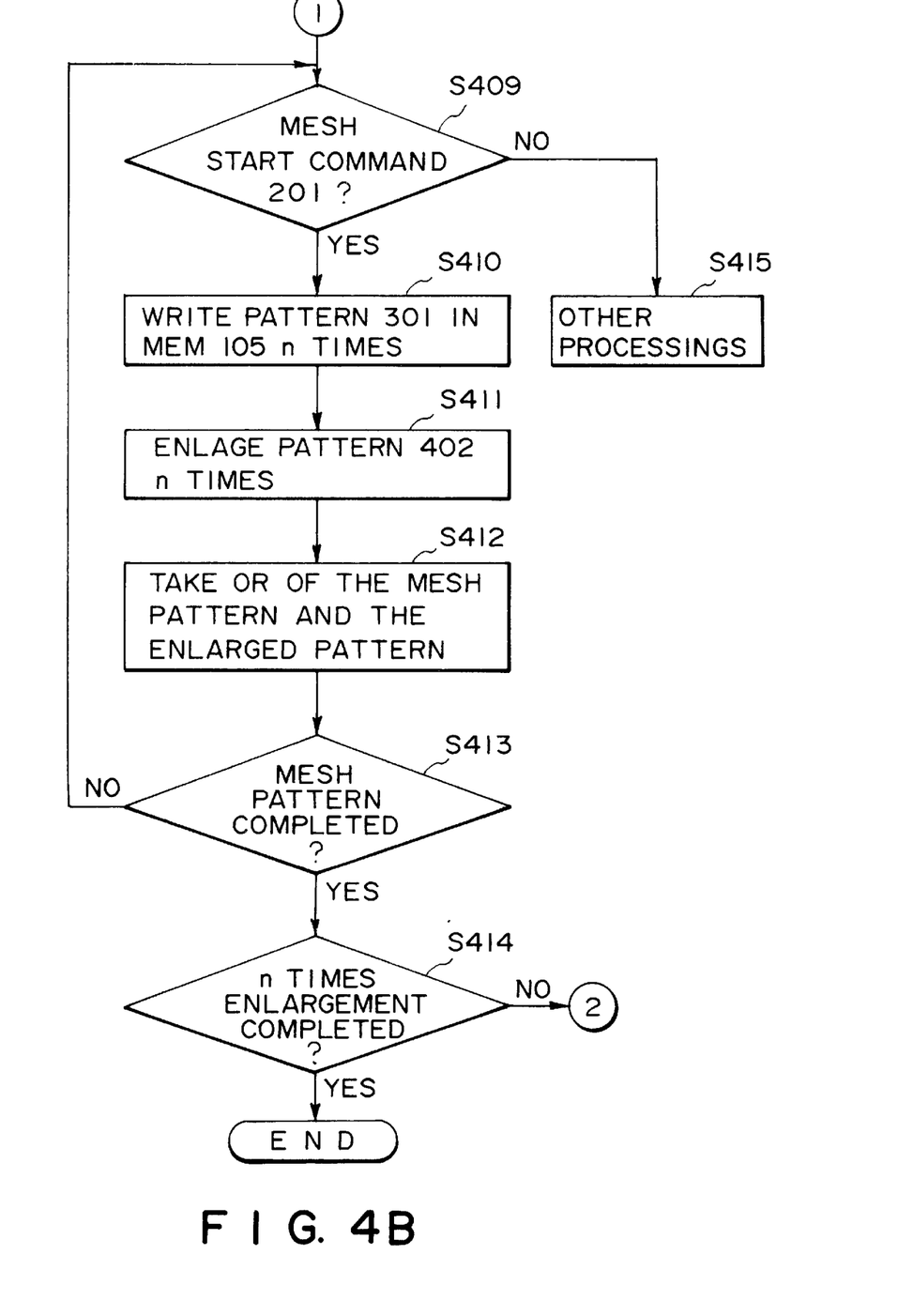

An operation of the output apparatus of this embodiment shown in FIG. 1 will be described with reference to FIGS. 4A and 4B.

Document data 121 sent from a host apparatus such as a host computer (not shown) is stored in the page memory 102 through the input I/F 101 (S401). The document data stored in the page memory 102 are sequentially read out to the main controller 104 and are converted into dot patterns with reference to the font memory 103. The dot patterns are then written in the bit map memory 105.

Figure 2A:
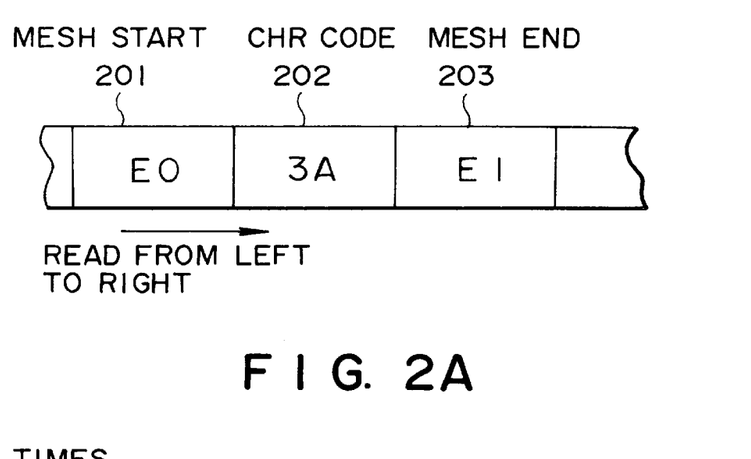
FIGS. 2A and 2B are views showing formats of document data.

FIG. 2A shows the normal document data 121. That is, when a mesh screen pattern start command 201 is input (S403), the main controller 104 determines its input, reads out a mesh screen pattern 301 in FIG. 3A with reference to the font memory 103, and writes the readout data in the bit map memory 105 (S404).

A character code 202 in FIG. 2A is read, and a character dot pattern 302 in FIG. 3 is read out with reference to the font memory 103 (S405). The mesh screen pattern 301 is read out from the bit map memory 105 and is logically ORed with the character dot pattern 302. The ORed data is stored in the bit map memory 105 again (S406). Therefore, a dot pattern 303 is written in the bit map memory 105. When a mesh end command 203 in FIG. 2A is input, the main controller 104 stops to take an OR of the character and mesh patterns (S407).

Figure 2B:
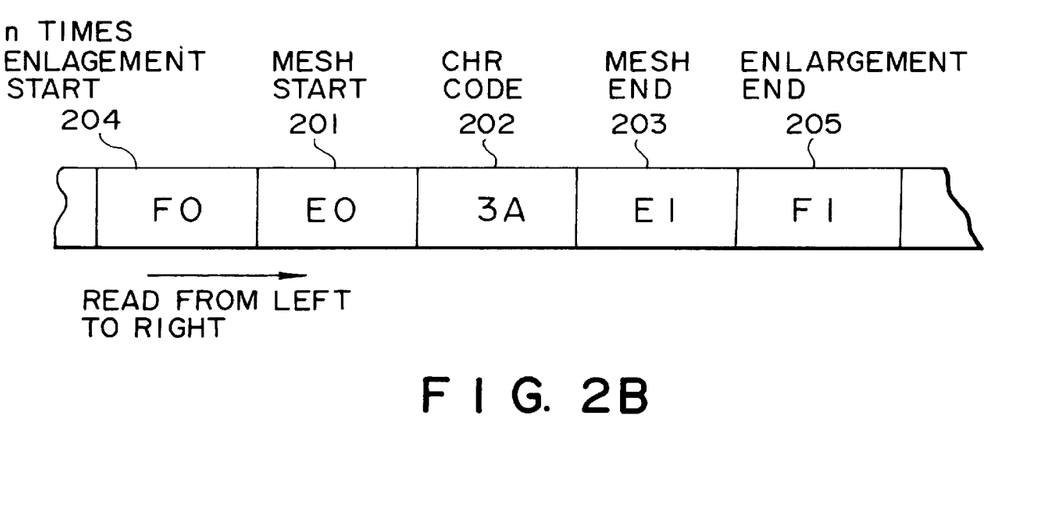

An operation performed upon input of document data of n times enlargement in FIG. 2B will be described below. The main controller 104 determines an n times enlargement start command 204 (S402) and writes the mesh pattern 301 twice in the vertical and horizontal directions in the bit map memory 105 in accordance with the mesh pattern start command 201 (S409) in step S410. The size of the character pattern 302 of a character code 202 is thus multiplied with n in the vertical and horizontal directions, and the enlarged pattern is written in the bit map memory 105 (S411). In this embodiment, in order to multiply the pattern with n, dots of the dot pattern are read out n times from the font memory 103 in both the vertical and horizontal directions. A character pattern 302 can be multiplied with n, and the enlarged pattern is logically ORed with a mesh pattern written in the bit map memory 105 n times. The resultant pattern is written in the bit map memory 105 (S412). Therefore, a dot pattern like a pattern 305 in FIG. 3 is written in the bit map memory 105. As is apparent from FIG. 3, quality of the mesh pattern of a pattern 305 and readability of the character in the mesh pattern can be greatly improved as compared with a pattern 304.

When one-page dot patterns are stored in the bit map memory 105, the main controller 104 sequentially stores the dot pattern data from the bit map memory 105 to the scan buffer 106.

The main controller 104 outputs a print start command 127 to the printer 109, and a read start command 128 to the read controller 107. The read controller 107 read-accesses the scan buffer 106 in synchronism with the vertical sync signal 124 and the horizontal sync signal 125 sent from the printer 109. The readout data is converted into parallel data by the series-parallel converter 108, and the converted data is sent to the printer 109 as dot data 126. When one buffer element in the scan buffer 106 becomes empty, the main controller 104 reads out the next scan dot data from the bit map memory 105 and sends it to the scan buffer 106. In this manner, one-page printing is performed.

In this embodiment, the area of each dot constituting the mesh pattern and a dot pitch are kept constant. However, these factors may be changed. For example, as represented by reference numeral 306 in FIG. 3, when a character is reduced, a dot pitch of the mesh pattern is reduced to increase the density of the mesh pattern in order to emphasize the presence of the character.

In this embodiment, a mesh pattern is exemplified as a screen pattern. However, the screen pattern is not limited to this. The present invention is equally applicable to an underline. That is, when an underlined character is to be enlarged, the thickness of the underline may not be enlarged, but its length is increased because simple enlargement of the underline causes an increase in thickness of the underline.

The above embodiment exemplifies a printer as an output apparatus. However, the output apparatus may be a display apparatus.

As has been described above, according to the present invention, the effect of emphasis of a mesh pattern or the like can be assured regardless of character enlargement/reduction. At the same time, excellent readability of characters can also be assured.

What is claimed is:

1. An output apparatus comprising:
   input means for inputting document data including at least one of an enlargement or reduction command, a mesh command and a character code; and
   output means for outputting, in response to said input means inputting the document data including the mesh command and the character code, a character pattern corresponding to the input character code with a mesh pattern corresponding to the input mesh command and being provided in an area of the character pattern, and for outputting, in response to said input means inputting the document data including the enlargement or reduction command, the mesh command and the character code, a character pattern, corresponding to the input character code, enlarged or reduced based on the input enlargement or reduction command with a mesh pattern corresponding to the mesh command and being provided in an area of the character pattern, wherein the mesh pattern is not enlarged or reduced.

2. An apparatus according to claim 1, wherein said output means comprises a printer.

3. An apparatus according to claim 1, wherein said output means comprises a display.

4. An apparatus according to claim 1, wherein the mesh command includes a meshing start command and a meshing end command and wherein said output means outputs a character pattern corresponding to an input character code placed between the meshing start command and the meshing end command with a mesh pattern corresponding to the mesh command.

5. An output apparatus according to claim 1, wherein, when said input means inputs the mesh command and then the character code, said output means outputs a character pattern corresponding to the input character code with a mesh pattern corresponding to the input mesh command which is provided in an area of the character pattern, and when said input means inputs the enlargement or reduction command, the mesh command and then the character code, said output means outputs a character pattern, corresponding to the input character code, enlarged or reduced based on the input enlargement or reduction command with a mesh pattern corresponding to the input mesh command which is provided in an area of the character pattern, wherein the mesh pattern is not enlarged or reduced.

6. An output control apparatus comprising:
   input means for inputting document data including at least one of an enlargement or reduction command, a mesh command and a character code; and
   pattern forming means for forming, in response to said input means inputting the document data including the mesh code and the character code, a character pattern corresponding to the input character code with a mesh pattern corresponding to the input mesh command and being provided in an area of the character pattern, and for forming, in response to said input means inputting the document data including the enlargement or reduction command, the mesh command and the character code, a character pattern, corresponding to the input character code, enlarged or reduced based on the input enlargement or reduction command with a mesh pattern corresponding to the mesh command and being provided in an area of the character pattern, wherein the mesh pattern is not enlarged or reduced.

7. An apparatus according to claim 6, further comprising output means for outputting the character pattern and the mesh pattern formed by said pattern forming means.

8. An apparatus according to claim 7, wherein said output means comprises a printer.

9. An apparatus according to claim 7, wherein said output means comprises a display.

10. An apparatus according to claim 6, wherein the mesh command includes a meshing start command and a meshing end command and wherein said pattern forming means forms a character pattern corresponding to an input character code placed between the meshing start command and the meshing end command in an area and forms the mesh pattern in the area.

11. An output control apparatus according to claim 6, wherein, when the mesh code and then the character code are input by said input means, said pattern forming means forms a character pattern corresponding to the input character code with a mesh pattern corresponding to the input mesh command which is provided in an area of the character pattern, and when the enlargement or reduction command, the mesh command and then the character code are input by said inputting step, said pattern forming means forms a character pattern, corresponding to the input character code, enlarged or reduced based on the input enlargement or reduction command with a mesh pattern corresponding to the input mesh command which is provided in an area of the character pattern, wherein the mesh pattern is not enlarged or reduced.

12. A method of outputting a pattern comprising the steps of:

inputting document data including at least one of an enlargement or reduction command, a mesh command and a character code; and outputting, in response to the document data including the mesh command and the character code being input, a character pattern corresponding to the input character code with a mesh pattern corresponding to the input mesh command and being provided in an area of the character pattern, and for outputting, in response to the document data including the enlargement or the reduction command, the mesh command and the character code being input, a character pattern, corresponding to the input character code, enlarged or reduced based on the enlargement or reduction command with a mesh pattern corresponding to the input mesh command and being provided in an area of the character pattern, wherein the mesh pattern is not enlarged or reduced.

13. A method according to claim 12, wherein said outputting step comprises a printer.

14. A method according to claim 12, wherein said outputting step comprises a display.

15. A method according to claim 12, wherein the mesh command includes a meshing start command and a meshing end command and wherein said outputting step outputs a character pattern corresponding to an input character code placed between the meshing start command and the meshing end command with a mesh pattern corresponding to the mesh command.

16. A method according to claim 12, wherein, when the mesh command and then the character code are input in said inputting step, then in said outputting step is output a character pattern corresponding to the input character code with a mesh pattern corresponding to the input mesh command which is provided in an area of the character pattern, and when the enlargement or reduction command, the mesh command and then the character code are input in said inputting step, then in said outputting step is output a character pattern, corresponding to the input character code, enlarged or reduced based on the input enlargement or reduction command with a mesh pattern corresponding to the input mesh command which is provided in an area of the character pattern, wherein the mesh pattern is not enlarged or reduced.

17. A method of outputting a pattern comprising the steps of:

inputting document data including at least one of an enlargement or reduction command, a mesh command and a character code; and forming, in response to the document data including the mesh code and the character code being input, a pattern by forming a character pattern corresponding to the input character code with a mesh pattern corresponding to the input mesh command and being provided in an area of the character pattern, and forming, in response to the document data including the enlargement or the reduction command, the mesh command and the character code, a character pattern, corresponding to the input character code, enlarged or reduced based on the input enlargement or reduction command with a mesh pattern corresponding to the mesh command and being provided in an area of the character pattern, wherein the mesh pattern is not enlarged or reduced.

18. A method according to claim 17, further comprising an outputting step for outputting the character pattern and the mesh pattern formed in said pattern forming step.

19. A method according to claim 18, wherein said outputting step comprises a printer.

20. A method according to claim 18, wherein said outputting step comprises a display.

21. A method according to claim 17, wherein the mesh command includes a meshing start command and a meshing end command and wherein said pattern forming step forms a character pattern corresponding to an input character code placed between the meshing start command and the meshing end command in an area and forms the mesh pattern in the area.

22. A method according to claim 17, wherein, when the mesh code and then the character code are input in said inputting step, a character pattern is formed in said forming step corresponding to the input character code with a mesh pattern corresponding to the input mesh command which is provided in an area of the character pattern, and when the enlargement or reduction command, the mesh command and then the character code are input in said inputting step, a character pattern is formed in said forming step corresponding to the input character code, enlarged or reduced based on the input enlargement or reduction command with a mesh pattern corresponding to the input mesh command which is provided in an area of the character pattern, wherein the mesh pattern is not enlarged or reduced.

23. A computer-usable medium storing computer-usable instructions for causing a program controlled output apparatus to perform a method comprising the steps of:

causing the apparatus to input document data including, at least one of an enlargement or reduction command, a mesh command and a character code; and causing the apparatus to output, in response to the document data including the mesh command and the character code being input, a character pattern corresponding to the input character code with a mesh pattern corresponding to the input mesh command and being provided in an area of the character pattern, and for causing the apparatus to output, in response to the document data including the enlargement or reduction command, the mesh command and the character code, a character pattern, corresponding to the input character code, enlarged or reduced based on the enlargement or reduction command with a mesh pattern corresponding to the input mesh command and being provided in an area of the character pattern, wherein the mesh pattern is not enlarged or reduced.

24. A computer-usable medium according to claim 23, wherein said instructions for causing the apparatus to output comprise communication with a printer.

25. A computer-usable medium according to claim 23, wherein said instructions for causing the apparatus to output comprise communication with a display.

26. A computer-usable medium according to claim 23, wherein the mesh command includes a meshing start command and a meshing end command and wherein a character pattern corresponds to an input character code placed between the meshing start command and the meshing end command with a mesh pattern based on the mesh command.

27. A computer-usable medium according to claim 23, wherein when the mesh command and then the character code are input by said instructions for causing input, said instructions for causing output cause the apparatus to output a character pattern corresponding to the input character code with a mesh pattern corresponding to the input mesh command which is provided in an area of the character pattern, and when the enlargement or reduction command, the mesh command and then the character code are input by said instructions for causing input, said instructions for causing output cause the apparatus to output a character pattern, corresponding to the input character code, enlarged or reduced based on the input enlargement or reduction command with a mesh pattern corresponding to the input mesh command which is provided in an area of the character pattern, wherein the mesh pattern is not enlarged or reduced.

28. A computer-usable medium storing computer-usable instructions for causing a program controlled output apparatus to output a synthesized pattern, the instructions comprising instructions for:

causing the apparatus to input document data including, at least one of an enlargement or reduction command, a mesh command and a character code; and causing the apparatus to form a pattern by forming, in response to the document data including the mesh code and the character code being input, a character pattern corresponding to the input character code with a mesh pattern corresponding to the input mesh command and being provided in an area of the character pattern, and forming, in response to the document data including the enlargement or reduction command, the mesh command and the character code, a character pattern, corresponding to the input character code, enlarged or reduced based on the input enlargement or reduction command with a mesh pattern corresponding to the mesh command and being provided in an area of the character pattern, wherein the mesh pattern is not enlarged or reduced.

29. A computer-usable medium according to claim 28, further comprising instructions for causing the apparatus to output the character pattern and the mesh pattern formed by said pattern forming instructions.

30. A computer-usable medium according to claim 29, wherein said instructions for causing the apparatus to output comprise communication with a printer.

31. A computer-usable medium according to claim 29, wherein said instructions for causing the apparatus to output comprise communication with a display.

32. A computer-usable medium according to claim 28, wherein the mesh command includes a meshing start command and a meshing end command and wherein said instructions for causing the apparatus to form a character pattern corresponding to an input character code placed between the meshing start command and the meshing end command in an area and to form the mesh pattern in the area.

33. A computer-usable medium according to claim 28, wherein when the mesh code and then the character code are input by said instructions for causing input, said instructions for causing forming cause the apparatus to form a character pattern corresponding to the input character code with a mesh pattern corresponding to the input mesh command which is provided in an area of the character pattern, and when the enlargement or reduction command, the mesh command and then the character code are input by said instructions for causing input, said instructions for causing forming cause the apparatus to form a character pattern, corresponding to the input character code, enlarged or reduced based on the input enlargement or reduction command with a mesh pattern corresponding to the input mesh command which is provided in an area of the character pattern, wherein the mesh pattern is not enlarged or reduced.

34. A printing method comprising the steps of:

receiving print data including, at least one of an enlargement or reduction command, a modification command and a character code from an external data source; and printing a character pattern corresponding to the received character code and enlarged or reduced in response to the received enlargement or reduction command with a modification pattern corresponding to the received modification command, if said receiving step receives the enlargement or reduction command, the modification command and then the character code, wherein the modification pattern is not enlarged or reduced in response to the received enlargement or reduction command.

35. A method according to claim 34, wherein the modification pattern comprises a mesh pattern.

36. A printing apparatus comprising:

reception means for receiving print data including, at least one of an enlargement or reduction command, a modification command and a character code from an external data source; and print means for printing a character pattern corresponding to the character code received by said reception means and enlarged or reduced in response to the enlargement or reduction command received by said reception means with a modification pattern corresponding to the modification command received by said reception means, if said reception means receives the enlargement or reduction command, the modification command and then the character code, wherein the modification pattern is not enlarged or reduced in response to the enlargement or reduction command.

37. An apparatus according to claim 36, wherein the modification pattern comprises a mesh pattern.

38. A computer readable medium having recorded thereupon a computer implementable method for printing comprising the steps of:

receiving print data including, at least one of an enlargement or reduction command, a modification command and a character code from an external data source; and printing a character pattern corresponding to the received character code and enlarged or reduced in response to the received enlargement or reduction command with a modification pattern corresponding to the received modification command, if said receiving step receives the enlargement or reduction command, the modification command and then the character code, wherein the modification pattern is not enlarged or reduced in response to the enlargement or reduction command.

39. A computer-useable medium according to claim 38, wherein the modification pattern comprises a mesh pattern.

* * * * *

UNITED STATES PATENT AND TRADEMARK OFFICE
CERTIFICATE OF CORRECTION

PATENT NO. : 5,847,713

DATED : December 8, 1998

INVENTOR(S) : SHIGERU UEDA

It is certified that error appears in the above-identified patent and that said Letters Patent is hereby corrected as shown below:

Title page, item
[56] AT REFERENCES CITED IN U.S. PATENT DOCUMENTS

"4,823,195 4/1989 Shimizu et al." should read
--4,823,192 4/1989 Shimizu et al.--.

Signed and Sealed this

Fourteenth Day of December, 1999

Attest:

Q. TODD DICKINSON

*Attesting Officer*     *Acting Commissioner of Patents and Trademarks*